Nov. 18, 1924.

A. DILLEHAY 1,516,151

STALK CUTTING MACHINE

Filed March 14, 1924   2 Sheets-Sheet 1

Inventor
A. Dillehay.

By *Clarence O'Brien*

Attorney

Nov. 18, 1924.
A. DILLEHAY
1,516,151
STALK CUTTING MACHINE
Filed March 14, 1924      2 Sheets-Sheet 2
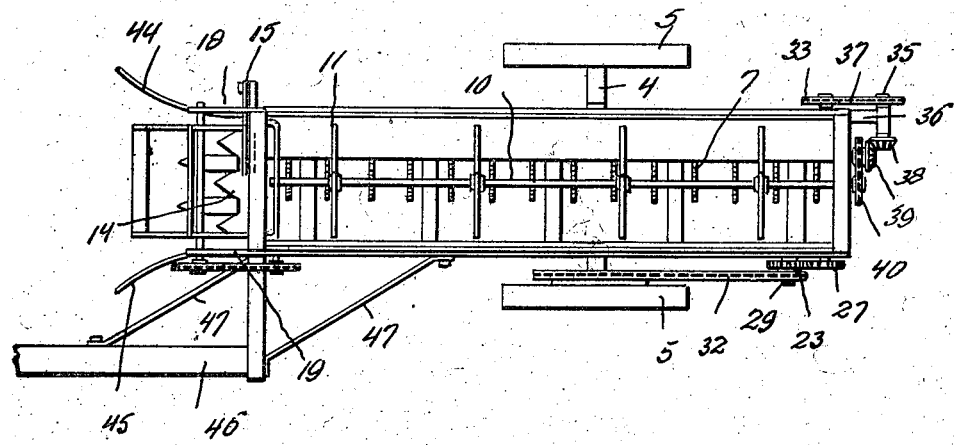
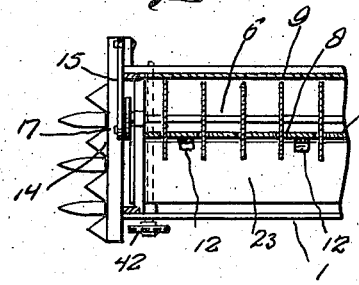
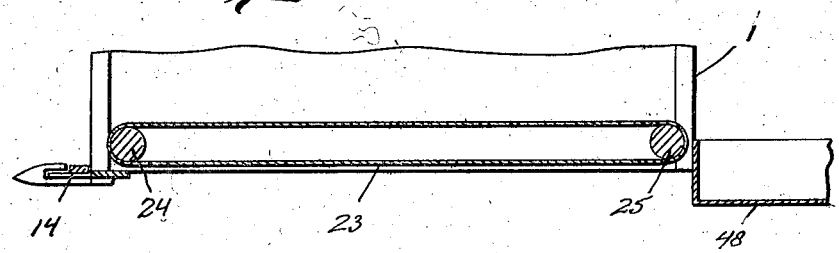

Patented Nov. 18, 1924.

1,516,151

UNITED STATES PATENT OFFICE.

ALDRIDGE DILLEHAY, OF ALLEN, TEXAS.

STALK-CUTTING MACHINE.

Application filed March 14, 1924. Serial No. 699,350.

*To all whom it may concern:*

Be it known that I, ALDRIDGE DILLEHAY, a citizen of the United States, residing at Allen, in the county of Collin and State of Texas, have invented certain new and useful Improvements in Stalk-Cutting Machines, of which the following is a specification.

This invention relates to new and useful improvements in agricultural machines and has for its principal objects to provide a stalk cutting machine which will sever the stalks from the ground, and cut the same up into small portions, means being provided for conveying the small portions of the stalks out of engagement with the cutters.

A further object of the invention is to provide a stalk cutting machine of the above mentioned character, which is adapted to travel over the row of growing stalks in such a manner as to facilitate the severing of the stalks from the ground, and cutting the severed stalks into small portions, means being provided for feeding the severed stalks to the cutter, and means being further provided for conveying the stalks which have been cut into small portions out of engagement with the cutter.

A still further object of the invention is to provide a stalk cutting machine of the above mentioned character, which is of such a construction as to have the several parts thereof adapted for simultaneous operation so as to efficiently sever the stalks from the ground and cut the same up into small portions whereby the latter may be used for any suitable purpose or may be gathered together and then burned or otherwise destroyed.

A further object of the invention is to provide a stalk cutting machine of the above mentioned character, which is simple in construction, inexpensive, strong and durable, and further, well adapted for the purposes for which it is designated.

Other objects and advantages of this invention will become apparent during the course of the following description.

Figure 1:
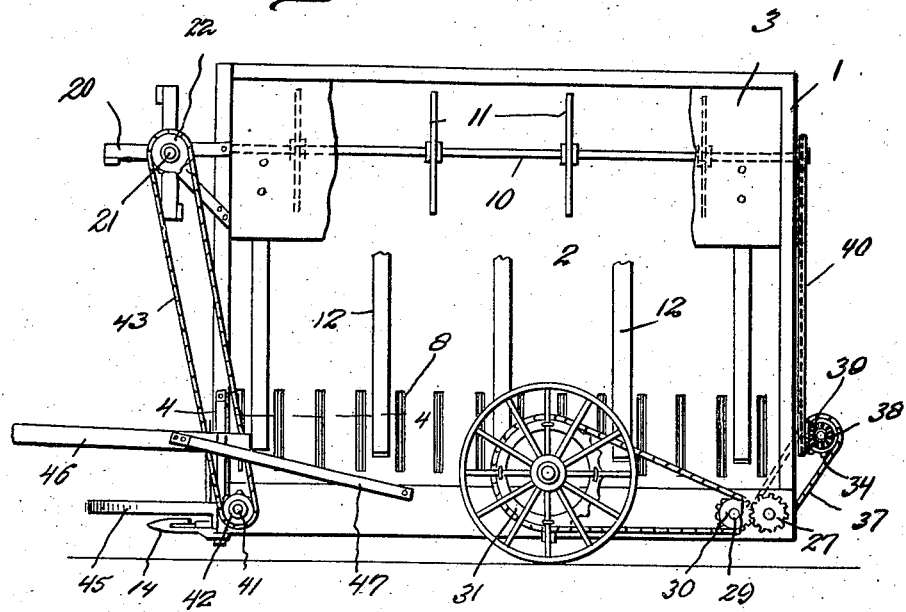
Figure 2:
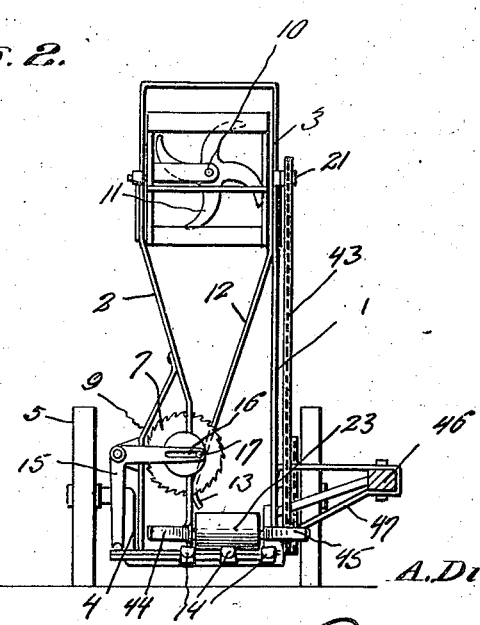

In the accompanying drawings forming a part of this specification, and in which like numerals designate like parts throughout the same, Figure 1 is a side elevation of my improved stalk cutting machine with parts broken away, Figure 2 is a front end elevation thereof, Figure 3 is a top plan view of the same, Figure 4 is a fragmentary section taken on line 4—4 of Figure 1, and Figure 5 is a fragmentary sectional view of the conveyor.

In the drawings wherein for the purpose of illustration is shown the preferred embodiment of my invention, the numeral 1 designates generally the frame of my improved stalk cutting machine, and the same includes the rear wall 2. The front of the frame 1 is open for its major portion, the only part of the same which is closed is the top portion which is illustrated at 3 in the drawings. The frame 1 is preferably supported intermediate its ends on the arched axle 4 which has the traction wheels 5 mounted on the respective ends thereof whereby the machine is rendered portable.

Extending longitudinally through the lower portion of the frame 1 is the shaft 6. The ends of the shaft 6 are journalled in any suitable manner in the end portions of the frame. Arranged at spaced intervals on the shaft 6 and adapted to rotate therewith, are the rotary cutters or saws 7. Any number of these rotary cutters may be provided as is found necessary. The rotary cutters 7 are further arranged to extend through openings or slots 8 provided in the lower portion of the rear wall 2 of the frame, and a suitable covering such as is illustrated at 9 in the drawings is provided to extend on the outer face of the rear wall 2 so as to completely house or encase the outer portions of the rotary cutters in the manner as clearly shown in Figure 2 of the drawings. The manner in which the shaft 6 and the rotary cutters 7 carried thereby is adapted to operate will be hereinafter more fully described.

Also extending longitudinally within the frame 1 and disposed between the upper portion of the rear wall 2 and the front wall 3 is the shaft 10, the ends of which are journalled in any suitable manner in the respective ends of the frame in the manner as shown in Figure 3 of the drawings.

Carried by the upper longitudinally extending shaft 10 and arranged in spaced relation thereon are the rotary fingers 11 which form a feeding means for co-operation with the rotary cutters 7 in a manner as will be presently described. Secured within the frame 1 and adapted to co-operate with the feeding means and rotary cutters are the guides 12. These guides are preferably formed of spring steel and are in the shape of elongated strips the upper ends of which are secured to the inner face of the front wall 3, the lower ends thereof being disposed inwardly and adapted to engage the inner face of the rear plate or wall 2 in such a manner as to have the lower curved ends 13 thereof disposed between certain of the rotary cutters in the manner as clearly shown in Figures 1 and 4 of the drawings. It is to be understood that any number of these guides 12 may be provided as is necessary for carrying out the functions for which they are designated.

Mounted on the forward end of the frame 1 adjacent the lower portion thereof and extending outwardly therefrom, is the sickle bar 14 and the same is adapted for reciprocatory movement by providing the usual bell crank lever 15 which has its upper arm provided with the elongated slot 16 therein for engagement with the pin 17 carried by the outer end of the shaft 6 upon which are mounted the rotary cutters 7. It is to be understood of course, that the bell crank lever 15 is supported on the frame in any well known manner.

Extending forwardly from the front and rear sides of the frame 1 adjacent the top thereof are the brackets 18 and 19 respectively, and adapted to be supported in the outer ends thereof is the reel 20. The shaft 21 upon which the reel 20 is mounted extends through apertures provided in the outer ends of the brackets 18 and 19 respectively, and has provided on its outer end a suitable sprocket wheel 22 whereby the same may be driven in the manner to be presently described. Arranged within the frame 1 in the bottom thereof directly below the rotary cutters 7 is the endless conveyor 23 which travels over the rollers 24 and 25, respectively, in the manner as clearly shown in Figure 5 of the drawings. This conveyor 23 is adapted to extend for the full length of the frame 1. Mounted on the outer end of the shaft 26 which supports the roller 25 is the gear wheel 27 and this gear wheel 27 is adapted to mesh with a similar gear 28 which is carried by the shaft 29 supported on the front side of the bottom portion of the frame. The outer end of the shaft 29 has a sprocket wheel 30 thereon which is adapted to co-operate with the sprocket wheel 31 carried by the traction wheel 5 and over which is adapted to travel the sprocket chain 32, whereby rotary movement to the roller 25 will be imparted through the gear wheels 27 and 28.

The opposite outer end of the shaft 26 has a sprocket wheel 33 mounted thereon for co-operation with a similar sprocket wheel 34 mounted on the outer end of a shaft 35 which extends through a suitable bracket 36 mounted on the rear of the frame 1. A sprocket chain 37 is adapted to extend over the aligning sprocket wheels 33 and 35 respectively. The inner end of the shaft 35 has a beveled gear 38 provided thereon and this beveled gear 38 meshes with a similar beveled gear 39 mounted on the outer end of the shaft 6 upon which the rotary cutters 7 are secured whereby rotary movement to the shaft and cutters thereon will be imparted simultaneously with the operation of the machine on the ground. Carried by the outer end of the shaft 6 adjacent the beveled gear 39 thereon is a suitable sprocket wheel which is adapted to co-operate with a similar sprocket wheel mounted on the outer rear end of the longitudinally extending shaft 10. A sprocket chain 40 is trained over the last mentioned sprocket wheel whereby rotary movement to the shaft 10 and the feeding means carried thereby will be imparted thereto simultaneously with the operation of the conveyor and rotary cutter shaft 6.

The outer end of the shaft 41 which supports the roller 24 has a suitable sprocket wheel 42 mounted thereon and the sprocket wheel 42 is adapted to co-operate with the sprocket wheel 22 mounted on the shaft 21 to receive the sprocket chain 43 whereby the reel 20 supported in the upper forward portion of the frame will be rotated simultaneously with the operation of the conveyor belt, rotary cutter shaft and rotary shaft 10 upon which the feeders 11 are mounted.

Extending forwardly from the forward end of the frame 1, and diverging from the front and rear sides thereof are the spring guide fingers 44 and 45, respectively, the same being preferably arranged directly above the sickle bar 14.

For the purpose of connecting the frame 1 to any suitable draft appliance, I provide the forwardly extending shaft 46 which is supported by the forward end of the frame and is braced thereon by means of the braces 47, whereby a means is provided for enabling the machine to be readily moved along the ground.

The operation of my improved stalk cutting machine may be briefly stated as follows: The machine is drawn along the ground and over the rows of growing stalks which are to be severed from the ground in such a manner as to have the forward end of the frame directly in alignment with the stalks. As is heretofore stated, movement of the traction wheels 5 along the ground will simultaneously cause the rotation of the conveyor belt 23, the rotary shaft 6 upon which the rotary cutters 7 are mounted, and from which motion is obtained the reciprocatory movement of the sickle bars 14 and as the latter are of the well known construction, the operation thereof is well understood, and it is not thought necessary to further go in detail relative to the same. The fingers 44 and 45 will tend to bring the stalks into position so that the reciprocating sickle bars 14 will sever the same adjacent the ground and the reel 22 will engage the tops of the stalks and force the same into the frame between the upper portions of the front and rear walls of the frame, where the rotary fingers 11 will force the severed stalks downwardly between the rear wall 2 and the guide strips 12 which taper gradually toward the bottom of the frame so that the stalks will be fed to the rotary cutters 7 where the same will be cut into short lengths and as the same are cut into the desired lengths, the same will be deposited onto the conveyor 23 and the conveyor 23 will deliver the short lengths of the severed stalks into a suitable receptacle 48 supported on the outer lower portion of the rear end of the frame in the manner shown in Figure 5 of the drawings. In this manner, growing stalks may be severed from the ground and delivered into the frame where the same will be forced downwardly into engagement with the circular saws or rotary cutters so as to cut the lengthy stalks into short lengths and delivering the short lengths into a suitable receptacle or the like after which they may be taken therefrom and burnt or destroyed if desired.

It will thus be seen from the foregoing description, that a stalk cutting machine has been provided which is very simple in construction, yet efficient in its operation, all of the parts being adapted to be actuated simultaneously, so as to insure the proper co-operation of the several elements in the handling of the stalks.

While I have shown the preferred embodiment of my invention, it is to be understood that various changes in the size, shape and arrangement of parts may be resorted to without departing from the spirit of the invention and the scope of the appended claims.

Having thus described my invention, what I claim is:—

A stalk cutting machine comprising a wheel mounted frame, stalk guiding fingers located at the forward end thereof, a knife mounted for reciprocatory movement at the forward end of the frame and below the fingers, a stalk bending means journaled for rotation at the upper forward portion of the frame, stalk beaters mounted upon a shaft, said shaft being journaled at the upper portion of the frame and disposed longitudinally thereof, stalk guides located below the stalk beaters, a shaft journaled at the lower portion of the stalk guides and disposed longitudinally of the frame, spaced saws mounted upon the last mentioned shaft and having peripheral portions disposed within the stalk guides, and a conveyor mounted at the lower portion of the frame and extending longitudinally thereof and disposed under the stalk guides and the saws.

In testimony whereof I affix my signature.

ALDRIDGE DILLEHAY.